J. H. BENNETT.
TRAIN STOPPING APPARATUS.
APPLICATION FILED APR. 9, 1915.

1,174,805.

Patented Mar. 7, 1916.
2 SHEETS—SHEET 1.

Inventor
J. H. Bennett,
By Victor J. Evans
Attorney

Witnesses
C. F. Rudolph
John J. McCarthy

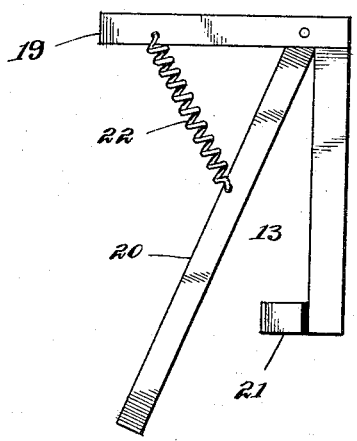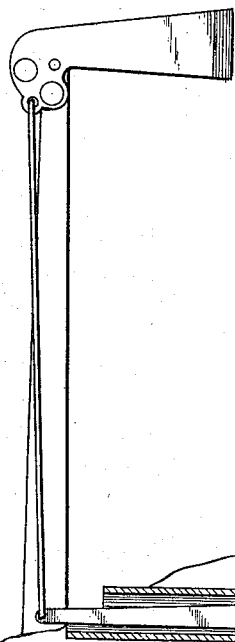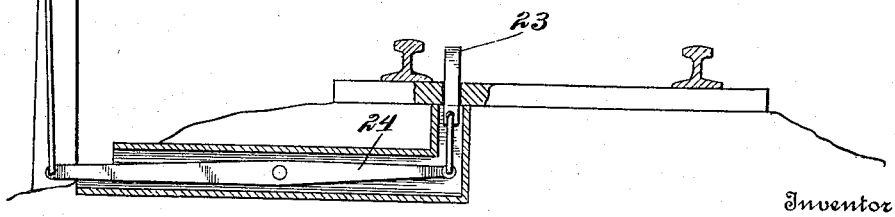

UNITED STATES PATENT OFFICE.

JAMES H. BENNETT, OF BOISE, IDAHO.

TRAIN-STOPPING APPARATUS.

1,174,805.  Specification of Letters Patent.  Patented Mar. 7, 1916.

Application filed April 9, 1915. Serial No. 20,297.

*To all whom it may concern:*

Be it known that I, JAMES H. BENNETT, a citizen of the United States of America, residing at Boise, in the county of Ada and State of Idaho, have invented new and useful Improvements in Train-Stopping Apparatus, of which the following is a specification.

This invention relates to improvements in automatic train stopping apparatus and has particular application to apparatus whereby the propelling power of a motor car will be cut off and the air brakes applied automatically in the event of the motor car running by a danger signal.

In carrying out the present invention, it is my purpose to provide automatic train stopping apparatus whereby through the medium of a motor the propelling power of the car will be cut off in the event of the car running by a danger signal and whereby the brakes will be subsequently applied by means of a second motor placed in operation succeeding the cutting off of the propelling power of the car.

With the above and other objects in view, the invention consists in the construction, combination and arrangement of parts hereinafter set forth in and falling within the scope of the claims.

Figure 1:
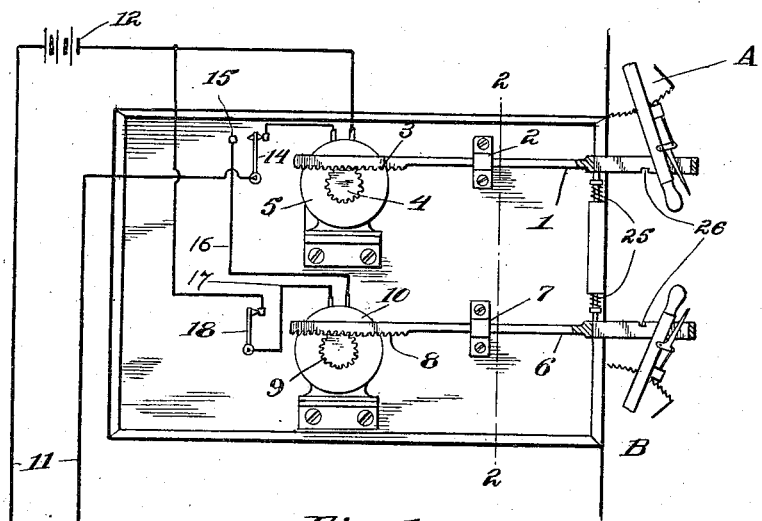
Figure 2:
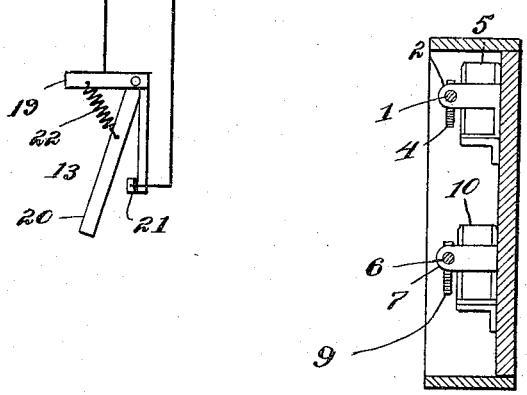

In the accompanying drawings: Figure 1 is a diagrammatic view of the car carried mechanism; Fig. 2 is a sectional view on the line 2—2 of Fig. 1. Fig. 3 is a view in elevation of the car carried circuit closer. Fig. 4 is a cross sectional view through the trackway showing the signal controlled track instruments.

In the present instance, I have shown the car carried mechanism of my invention as installed in a steam driven locomotive and in this connection I wish it to be understood that the invention, in its useful application, is not limited to use with this particular type of locomotive, as the same is equally applicable to locomotives propelled by electricity and other motive agents.

Referring now to the drawing in detail, A designates the throttle valve lever of a locomotive, while B indicates the engineer's brake valve. Connected with the throttle lever A through the medium of a pin and slot connection is one end of a rod 1 slidably mounted within bearings 2 and formed with rack teeth 3 adjacent to the other end thereof. The rack teeth 3 mesh with a pinion 4 keyed upon the armature shaft of an electric motor 5. Connected with the handle of the engineer's brake valve through the medium of a pin and slot connection is one end of a rod 6 slidably mounted within suitable bearings 7 and formed, adjacent to the remaining end, with rack teeth 8 meshing with a pinion 9 keyed upon the armature shaft of an electric motor 10. The motor 5 is connected in an electric circuit 11 including a suitable source of electrical energy as a battery 12 and a circuit closer 13. Also connected in the circuit 11 is a switch 14 and disposed in the path of movement of the blade of the switch 14 is a contact 15 connected by way of a wire 16 with one side of the motor 10. From the remaining side of the motor 10 leads a conductor 17 terminally connected with the side of the circuit 11 opposite from that including the switch 14. Connected in the conductor 17 is a switch 18 and the blades 14 and 18 are disposed in the paths of the rods 1 and 6 respectively.

The switch 13 comprises a plate 19 fastened to an appropriate part of the motor car and a movable contact arm 20 pivotally connected to the plate 19 and connected to one side of the circuit 11, and a contact 21 connected to the remaining side of the circuit 11 and carried by the plate 19 and insulated therefrom and disposed in the path of movement of the contact arm 20. The contact arm 20 is normally held out of engagement with the contact 21 by means of an expansion spring 22 interposed between the plate 19 and the arm 20. When, however, the contact arm 20 is swung into engagement with the contact 21, the friction between such contact and arm holds the arm in engagement with the contact against the action of the spring 22 so that the circuit controlled by the switch will be held closed.

Located along the trackway and spaced apart and disposed adjacent to the respective road signals are track instruments. Each track instrument comprises a vertically movable trip 23 capable of movement to active and inactive positions and connected through the medium of link mechanism 24 with the blade of the adjacent semaphore, as clearly illustrated in Fig. 4 of the drawings, so that when the blade moves to danger position, the trip will be rendered active, while when the blade moves to clear position the trip will be rendered inactive.

In practice, when a train runs by a danger signal, the contact arm 20 strikes against the active trip 23 and is swung into engagement with the contact 21 against the action of the spring 22, thereby closing the circuit 11 and in the closing of the circuit 11 the motor 5 is energized. In the operation of the motor 5 the rod 1 is moved longitudinally within its bearings 2 to swing the throttle lever to closed position and as the rod 1 reaches the limit of its movement under the action of the motor the particular end thereof engages the blade of the switch 14 and swings such blade into engagement with the contact 15, thereby breaking the circuit of the motor 5 and closing the circuit of the motor 10. The motor 10 is now placed in operation and exerts a pull upon the rod 6 with the effect to operate the engineer's brake valve to bring about an emergency application of the brakes. When the rod 6 reaches the limit of its movement under the action of the motor the outer end of the rod 6 engages the blade of the switch 18 and opens the circuit of the motor 10, thereby deënergizing the last-mentioned motor.

The motors 5 and 10, the switches associated therewith and the horizontal rods 1 and 6 are preferably disposed within a casing as shown in Figs. 1 and 2 of the drawings and the rods 1 and 6 slide within openings formed in one end wall of the casing and secured to such end wall are spring operated latching dogs 25 adapted to engage in notches 26 formed in the adjacent edges of the rods 1 and 6 respectively, such dogs acting to hold the levers locked in operated position.

I claim:

1. In automatic train stopping apparatus, the combination with a controlling element of the motor car and the handle of the engineer's brake valve, of an electric motor, a pinion on the shaft of said motor, a rod connected with said controlling element and having rack teeth formed thereon meshing with said pinion, a second motor, a pinion on the shaft of the last-mentioned motor, a rod connected to the handle of said brake valve and having rack teeth formed thereon meshing with the last-mentioned pinion, an electric circuit for said motors, a switch connected in circuit with the first-mentioned motor and operable from the first-mentioned rod to break the circuit through said first motor and establish a circuit for the second-named motor, a switch connected in circuit with the second-named motor and operable from the second-named rod to break the circuit of the last-mentioned motor in the movement of said rod, a switch for closing said circuit primarily, and means for locking said rods in operated position.

2. In automatic train stopping apparatus, the combination with a controlling element of the motor car and the handle of the engineer's brake valve, of an electric motor, a pinion on the shaft of said motor, a rod connected with said controlling element and having rack teeth formed thereon meshing with said pinion, a second motor, a pinion on the shaft of the last-mentioned motor, a rod connected to the handle of said brake valve and having rack teeth formed thereon meshing with the last-mentioned pinion, an electric circuit for said motors, a switch connected in circuit with the first-mentioned motor and operable from the first-mentioned rod to break the circuit through said first motor and establish a circuit for the second-named motor, a switch connected in circuit with the second-named motor, and operable from the second-named rod to break the circuit of the last-mentioned motor in the movement of said rod, a switch for closing said circuit primarily, and a spring actuated dog for locking said rod in operated position.

In testimony whereof I affix my signature in presence of two witnesses.

JAMES H. BENNETT.

Witnesses:
IRA E. HIGH,
J. P. POPE.

Copies of this patent may be obtained for five cents each, by addressing the "Commissioner of Patents, Washington, D. C."